US007085650B2

(12) United States Patent
Anderson

(10) Patent No.: US 7,085,650 B2
(45) Date of Patent: Aug. 1, 2006

(54) SYSTEM AND METHOD OF GEOSPATIALLY MAPPING TOPOLOGICAL REGIONS AND DISPLAYING THEIR ATTRIBUTES

(75) Inventor: James J. Anderson, Anchorage, AK (US)

(73) Assignee: GIS Data Resources, Inc., Novato, CA (US)

( * ) Notice: Subject to any disclaimer, the term of this patent is extended or adjusted under 35 U.S.C. 154(b) by 0 days.

(21) Appl. No.: 11/123,258

(22) Filed: Oct. 6, 2004

(65) Prior Publication Data

US 2005/0209781 A1   Sep. 22, 2005

Related U.S. Application Data

(63) Continuation of application No. 10/360,960, filed on Feb. 7, 2003, now abandoned.

(60) Provisional application No. 60/357,571, filed on Feb. 15, 2002.

(51) Int. Cl.
    *G01B 7/00* (2006.01)
(52) U.S. Cl. .............................. 702/2; 702/5; 702/150
(58) Field of Classification Search ................ 702/1–6, 702/150; 707/6, 104.1, 100, 3, 103 R; 701/201, 701/209
    See application file for complete search history.

(56) References Cited

U.S. PATENT DOCUMENTS

| | | | | |
|---|---|---|---|---|
| 5,796,634 A | * | 8/1998 | Craport et al. | 702/150 |
| 6,101,496 A | * | 8/2000 | Esposito | 707/6 |
| 6,115,669 A | * | 9/2000 | Watanabe et al. | 701/209 |
| 6,119,065 A | * | 9/2000 | Shimada et al. | 701/201 |
| 6,308,177 B1 | * | 10/2001 | Israni et al. | 707/100 |
| 6,523,024 B1 | * | 2/2003 | Yajima et al. | 707/3 |
| 6,684,219 B1 | * | 1/2004 | Shaw et al. | 707/103 R |
| 2003/0140064 A1 | | 7/2003 | Klein | 707/104.1 |

OTHER PUBLICATIONS

RockWare Inc. ArcView 3.X 2000 all versions, Dec. 30, 2000, Company product, All versions, All pages.*
ESRI, Are you ready for G-Government, ArcUser, Jan. 21, 2001, ArcUser, Jan. 2001, pp. 1-4.*

* cited by examiner

*Primary Examiner*—John Barlow
*Assistant Examiner*—Victor J. Taylor
(74) *Attorney, Agent, or Firm*—Nixon Peabody LLP

(57) ABSTRACT

A geographical information system and a method are disclosed for geospatially mapping a least one parcel polygon within a geographical region and for displaying at least one specific attribute of each parcel polygon, i.e. a topological area within the given geographical region, as an attached attribute of latitude and longitude coordinates. The centroid or center point of each of the parcel polygons is determined and stored into conventional computer storage means. The latitude and longitude point feature at the centroid of each parcel polygon is established and similarly stored. A unique tax identification number, e.g. the Assessor Parcel Number (APN) or Parcel Identifier Number (PIN), is assigned to each of the point features. A correlation is then made between the unique tax identification number of the point feature to a text list of at least one attribute, e.g., the physical address of the parcel polygon, of each of the point features. This attribute becomes attached to each point feature. The resulting parcel polygon map and point features with one or more of the attached attributes can then be displayed within a GIS or CAD system to provide the user, for example, accurate locations of street addresses for use in environments that require pinpoint accuracy, such as emergency response.

3 Claims, 10 Drawing Sheets

SYSTEM AND METHOD OF GEOSPATIALLY MAPPING TOPOLOGICAL REGIONS AND DISPLAYING THEIR ATTRIBUTES

This application claims the benefit of prior U.S. provisional application Ser. No. 60/357,571, filed Feb. 15, 2002. This application is a continuation of application U.S. Ser. No. 10/360,560, filed Feb. 7, 2003, now abandoned (published as Publication No. 2003/0158668 on Aug. 21, 2003).

FIELD OF INVENTION

The present invention relates generally to digital, street-centerline based, geographic information systems (GIS). More particularly it relates to a geographical information system capable of locating and displaying a physical address or array of addresses in exact geographical location, and a method of linking and making available specific latitude and longitude coordinates as well as other attributes for each address or property.

BACKGROUND OF THE INVENTION

The prior art encompasses the long human history of cartography and navigation up to and including recent technological innovations. Examples include the achievement of seaworthy timepieces, which revolutionized and made accessible exact and reliable readings of longitude, and satellite technology and the Global Positioning System (GPS), which have revolutionized navigation. The field currently makes use of computer technology and the capacity of computers for quickly processing huge amounts of data and displaying data and permutations thereof to human users. The prior art then, includes the fields of cartography and navigation, surveying, photography, aviation, electronics and at least the following computer or digital arts: digital scanning of photographic images and digital rectification of stereo imagery into 3-dimensional information; computer processing; computer input technology such as punch cards, disc drives, keyboards and pointing devices; computer output technology such as display terminals, disc drives and discs, printers, and other output devices; computer communication technology such as networks, modems, file transfer protocols; database technology; mathematical and geometrical computer algorithms; and software including but not limited to ArcView 3.2a, MapInfo, and other Computer Aided Drafting (CAD) and GIS software.

GIS systems store, retrieve and display topological and cartographic information. The topographic study may be a map having features of the geographic region including natural features, such as rivers, lakes, and the like, and man-made features, such as canals, bridges, roads, and the like.

In conventional GIS systems, roads and streets are represented by lines, which show the center of the street to varying degrees of accuracy depending on the information used. These lines are called street centerlines. Prior art GIS street databases represent streets (major and minor roads, highways, parkways, paved and unpaved, and the like) as street centerline vectors, where the vectors are digitized line segments in a digitized topographical map, wherein at least certain points correspond to fixed latitude and longitude coordinates.

Heretofore, GIS street centerline files incorporate address ranges as attributes of street vectors. Thus, a given street line segment in prior art applications may show or be capable of showing an address range, as illustrated in FIG. 1a, which represents the physical addresses that may be found on that section of road. A typical example is a street segment with the address ranges 2, 4 up to 98 on the even number side of the street and 1, 3 up to 99 on the odd number side of the street. Address ranges are typically assigned to street segments during database construction by an operator with reference to ZIP code and basic address-to-ZIP and street-name information. This type of information is broad and inexact. Human guesswork often comes into play in assigning a particular address range to a particular street segment. In prior art applications, an address range shown may actually be on the segment of the road where it is depicted, or it may be blocks or miles away on the same street. In the example shown in FIG. 1a, it is not possible to determine whether the street segment in question has 99 physical structures, 10, 1 or none.

In prior art applications, address matching software applications within GIS determine the latitude and longitude coordinates of a street address. In such applications, a user who wishes to determine the latitude and longitude coordinates of a particular address would be able to get no more exact than the coordinates of the assigned address range in the database, with the above mentioned caveat that at times the assigned range is incorrect.

There are mission-critical applications that require the correct and instantaneous display of latitude and longitude points for a given street address. Mission-critical applications include emergency response applications to accurately locate a car crash, fire or medical emergency. In emergency response, the dispatcher and responder need to locate the crisis quickly and accurately in order to respond within the window of time in which the emergency can be addressed. For instance, medical emergencies often involve a finite period of time during which medical attention can save Ate victim's life. Every minute and second that can be shaved off of response time increases the victim's chances for survival. In the case of fire response, time can also make the difference between life and death, and it can take a large fire engine a several minutes to change course or perform a U-turn, adding urgency to the responder setting out with accurate information.

Prior art GIS street databases are not capable of displaying exact, accurate physical locations of street addresses, thus, in mission-critical applications, these address range interpolation data models are not capable of meeting the need for an exact address location.

Therefore, there is a need for a GIS street database, which can display accurate locations of street addresses for use in environments that require pinpoint accuracy, such as emergency response. While emergency response has been used to illustrate the capacities and limitation of prior art applications, it is by no means the only area for application of the present invention. As set forth below, there are many market sectors where accurate location of clients, prospects and capital have broad application.

SUMMARY OF THE INVENTION

In one embodiment of the present invention, a method is disclosed for geospatially mapping one or more parcel polygons within a given geographical region and for displaying specific attributes of each parcel polygon as attached attributes of the latitude and longitude coordinates. The steps of this method include:

(a) determining the centroid or center point of each the parcel polygon or topological area within the given geographical region;

(b) establishing a latitude and longitude point feature at the centroid of each parcel polygon;

(c) assigning a unique tax identification number, e.g. the Assessor Parcel Number (APN) or Parcel Identifier Number (PIN), to each of the point features;

(d) correlating the unique tax identification number of the point feature to a text list of at least one attribute of each of the point features and thereby attaching this attribute to each point feature; and (e) displaying a geospatial map of the geographical region and point features with one or more of the attached attributes within a GIS or CAD system.

In most applications, the most important attribute attached to each latitude and longitude point feature is the physical address or street address of each parcel polygon. Other attributes that are attached include, but not limited to the landowner's name and gender and the assessed valuation of the land. If a structure exists on the parcel polygon, the other attributes include building use code, phone number, SIC code, number of employees, total sales volume, household income, and similar information.

One embodiment of the system of the present invention includes the following means:

(a) means for digitizing and storing surveyed parcel polygon data for the geographical region and for displaying a digital map of the region;

(b) means for overlaying each of the resulting parcel polygons onto the digital map with reference to the latitude and longitude coordinates of the region to form a parcel polygon map;

(c) means for determining the geometric centroid of each parcel polygon having a unique tax identification number on the parcel polygon map from means (b) and for establishing the latitude and longitude point feature for each centroid;

(d) means for removing the parcel polygon lines from the parcel polygon map from means (c) and for displaying a parcel polygon map showing a single latitude and longitude point feature for each parcel polygon; and (e) means for correlating the unique tax identification number for each point feature with at least one attribute of the point feature from a text list, for attaching the attribute to each point feature, and for displaying the parcel polygon map from means (d) with the attached attribute.

The foregoing means can be combined and housed within one or more computers, networks of computers, or one or more computer systems as discussed in greater detail below.

BRIEF DESCRIPTION OF THE DRAWINGS

Further features and advantages will become apparent from the following and more particular description of the preferred embodiment of the invention, as illustrated in the accompanying drawings in which.

DETAILED DESCRIPTION OF THE BEST MODE OF THE INVENTION

A system and a method of the present invention for geospatially mapping topological areas or parcel polygons within a geographic region and displaying specific attributes of the parcel polygons, attached as attributes of specific latitude and longitude coordinates is described in detail below.

The present invention is best understood as a series of steps involving a human operator or operators, using existing computer hardware and software, computer and visual data sources created or purchased for the purpose, and computer and operator functions, to produce unique integrated data sets which can be viewed in a variety of formats.

The method can be performed on any present or future computing device with sufficient memory and processor speed to handle the data input and manipulation required. The inputs include a digitally scanned map and orthophotographic data, and text listings of physical and legal property attributes. Data inputs maybe transferred into the computer by floppy disk, compact disk, infrared transfer, magnetic tape, modem, network or cable transfer, digital scanner, keyboard entry, or through any medium the computer supports.

Data manipulation includes application of geometric algorithms, display of images and text lists, iterative matching of common fields in separate databases, creation of expanded, combined or new databases upon operator instruction. Data manipulation in one embodiment of the present invention includes derivation of geometric points associated with exact latitude/longitude map coordinates and association of text attributes with said geometric points. Data manipulation may further include grouping map, geometric or attribute information into for display in commonly used or custom format, including but not limited to, Arc-View 3.2a, MapInfo, and other CAD and GIS display formats.

It is expected that the present invention will continue to be fully compatible with future computer systems. What computer system is used is immaterial and does not affect the present invention.

There are three concepts key to understanding the present invention. The first is the concept of georeferencing map features. Georeferencing is essentially the process of assigning accurate latitude/longitude coordinates to map features. When this is done, each map feature can be independently located in its absolute position on the planet, rather than simply in relation to geographic or man-made features.

Figure 1A:
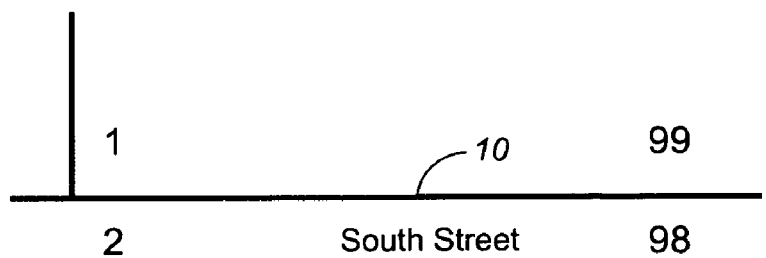
FIG. 1A shows an example of a prior art street centerline segment with an estimated address range.
Figure 1B:
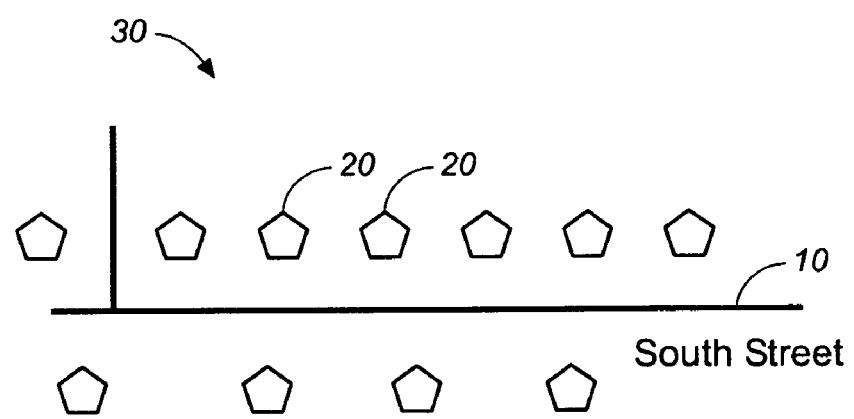
FIG. 1B shows an example of a prior art street centerline segment with actual structures and addresses used in accordance with one embodiment of the present invention.

The second key concept is that of displaying specific, man-made features, such as street-side points on detailed street centerline maps. In prior art methods, street centerline maps, or those which display streets by depicting a georeferenced line corresponding to the center of the street, have displayed only special sites, such as schools, monuments, and centers of municipal function such as police or fire stations, as points along the street centerline. Prior art methods give estimated address ranges along street centerlines with varying levels of accuracy as described in more detail in the BACKGROUND OF THE INVENTION section. The present invention maps each building within a given geographic region to its specific latitude and longitude, displaying each building on a street as a point in its exact location and in relation to the appropriate street centerline. FIG. 1A illustrates street centerline 10 with estimated address ranges 1–99 on odd number side of street centerline 10 and 2–98 on the even side of the street. FIG. 1B shows the same street centerline 10 with address points 20, referred to herein as Address Points map 30.

Figure 2:
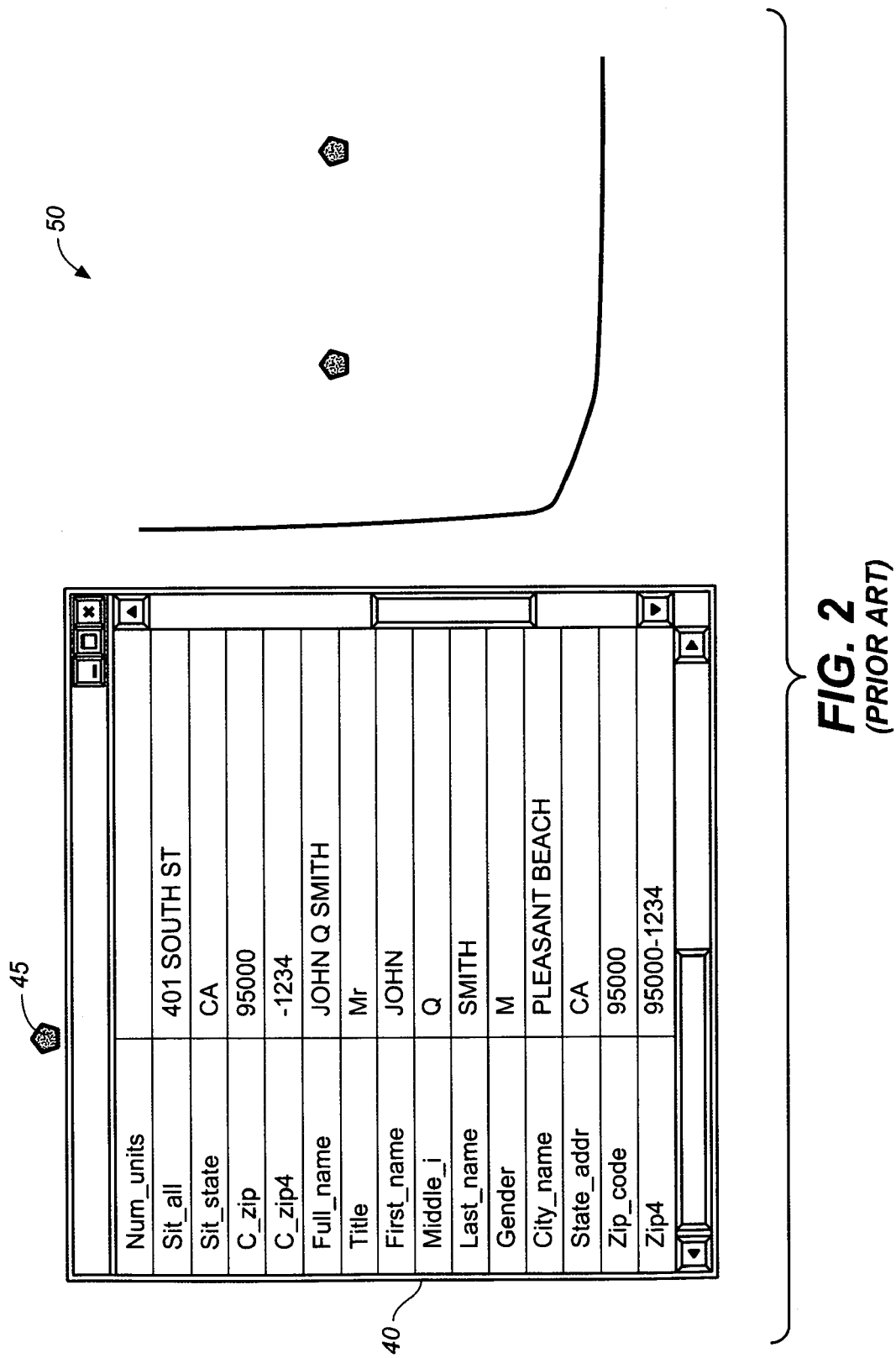
FIG. 2 shows an example example of a prior art centerline segment with one point feature selected, and a display of certain associated attributes attached to the point feature used in accordance with one embodiment of the present invention.

The third key concept is the concept of electronically linking independent attributes 40 so that information, previously available only in list or database form, now becomes embedded in the Address Points map 50 is shown in FIG. 2. Thus, a wide array of information is viewable for each point feature. Specifically, FIG. 2 shows one embodiment of the present invention in which multiple attributes 40. e.g., landowner's name and complete street address, attached to one map center point 45 are displayed.

The present invention, then, begins with surveyed parcel polygon data for a given geographical region. This data is entered into a computer by whatever means is most practical. Likewise, if it is not already part of a general map of the region, a digital map is obtained or created and entered into the computer, and the parcel polygons are overlaid on the digital map with reference to latitude and longitude coordinates for the region. Parcel polygon maps contain a unique Assessor Parcel Number (APN) or Parcel Identifier Number (PIN) for each parcel polygon.

Figure 3:
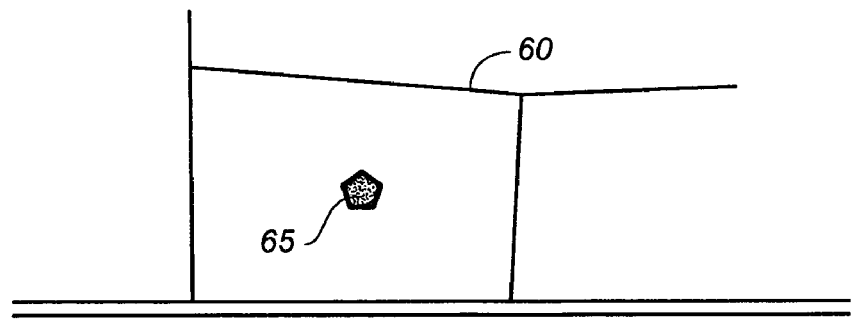
FIG. 3 shows an example of a prior art polygon as it might appear on a parcel polygon map, with a derived centroid used in accordance with one embodiment of the present invention.

By means of standard geometric algorithms performed by computer, the geometric center point, or centroid, of each parcel polygon is calculated. FIG. 3 illustrates a single parcel polygon 60 with a derived centroid 65. Each centroid, or point feature, then has a corresponding map latitude and longitude, which is derived by computer algorithm from the map coordinates and the map location of the point feature.

Next, the derived centroids are substituted on the map for the parcel polygon lines, giving a "clean" map with a single point feature for each parcel polygon. The point features retain the labeled APN's or PIN's of the original maps. These two attributes, latitude/longitude coordinates and APN/PIN number, derived in the process of combining basic source data, are the first of many attributes that can be attached to point features in the present invention, and viewed in the product. The term "product" used herein means the specific geographical region or area that is geospatially mapped using the method and system of the present invention.

The accuracy of the product in the present invention can be further verified by the following method: When available, at least one georeferenced orthophotograph is obtained for the region, and it is digitized if not already in digital format and entered in to the computer database. Using the latitude and longitude markers of the photograph and the map data, the map is overlaid onto the orthophotograph. An operator examines the combined photo and map to verify and correct map features, and to determine if there are any structures on each parcel polygon. The operator corrects the digital map to reflect the presence and exact location of structures and other map features.

Figure 4A:
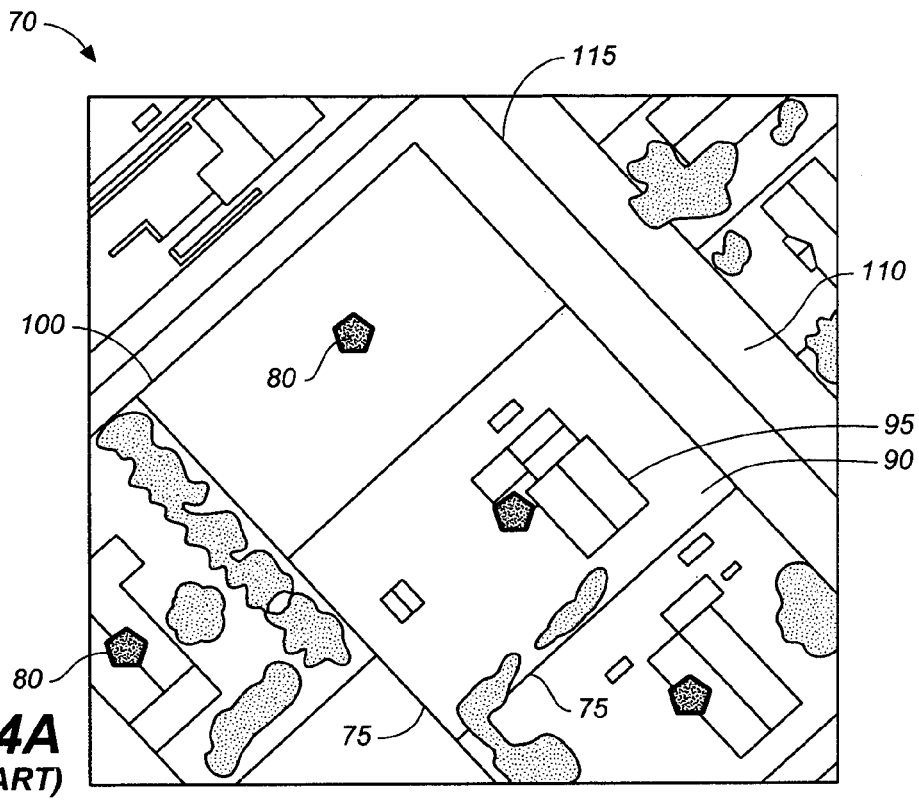
FIG. 4A shows an example of a prior art orthophotograph/map overlay used in accordance with one embodiment of the present invention, wherein the orthophotograph, parcel polygon line segments, derived centroids, a few structures, a parcel polygon with no structure, and streets are all visible.

FIG. 4A depicts map/orthophotograph overlay 70 with polygon line segments 75 and centroids 80 both visible, to clearly show an area where there is parcel polygon 90 with structure 95, parcel 100 with no structure, and road 110 having street centerline 115.

Figure 4B:
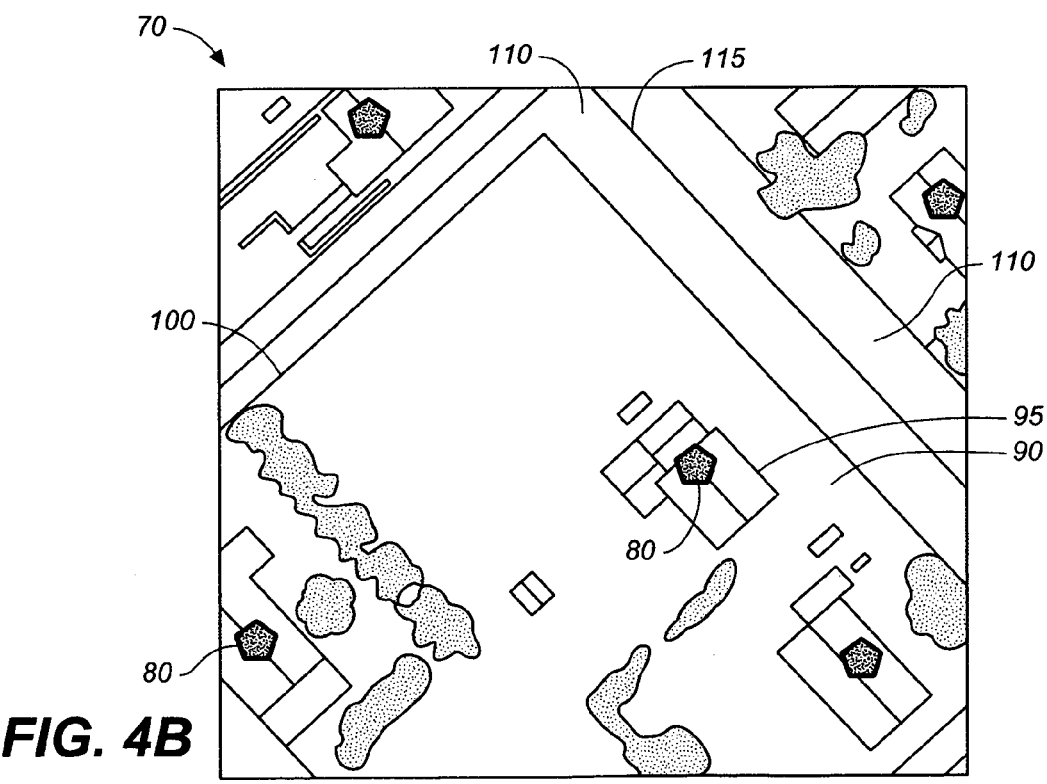
FIG. 4B shows substantially the same overlay area as FIG. 4A wherein the orthophotograph, structures, point feature on the structures and street centerline are visible; the parcel polygon line segments have been removed; and a point feature associated with the property without structure is hidden.

FIG. 4B depicts the same overlay 70, with polygon line segments no longer visible, and the point feature hidden in parcel 100 on road 110 with no structure.

Land use codes are discussed in the iterative process below. It is important to mention them here, because on parcel polygons where there is no structure, the land use code determines what the point feature looks like when it is displayed. The symbol used is keyed for the viewer to types of land use. Likewise, in some products of the present invention, different point symbols are used to differentiate between different building use codes associated with each structure.

For any given area being treated by the present invention, there exists at this point in the process, digital imagery associated with the maps and orthophotographs, and text information in the form of the APN/PIN number and latitude/longitude coordinates. It is one of the innovative features of the present invention to allow a user to search and view these specific attributes of a particular structure or property by electronically selecting a digital point feature representing that structure using a mouse, keyboard, pointer or any other means.

It is recognized by one skilled in the art that the textual information can to be organized in a database. That is, a computer record which separates and associates individual pieces of information in a logical fashion so that an operator, or another computer program or programmed routine, can conduct simple or sophisticated searches and sorting of the data so organized. Each point feature in the present invention now has a name (its APN/PIN number) and a geographical location. Now, a text list of APN/PIN tags and physical addresses for the region is correlated to the database by matching the APN/PIN tags so that the physical address of each structure is included as a field value in the database of one embodiment of the present invention. The physical address thereby becomes a unique attribute of each point feature. It is an innovation of the present invention to allow a user to view the physical address of a particular structure by electronically selecting, for example, a mouse, keyboard, pointer or any other means, a digital point feature representing that structure. The GIS systems disclosed in the prior art do not have this capability.

The present invention, then, by means of incorporating the above mentioned information in a database, allows simple but previously unavailable functions to the user, such as specifying a street name in a particular locale to the present invention, e.g., by means of keyboard, mouse, or any other electronic interface, and viewing not only that street and its environs, but each structure on the street in its exact location. Perhaps more to the point, the user, for instance, an emergency responder, can specify a particular known piece of information such as address or telephone number, and be provided by one embodiment of the present invention with a detailed area map including the exact location of the structure in question in relation to the street and in relation to other structures. Such a responder can often obtain automatically obtain the telephone number from a caller in an emergency situation and thereby be able to send a response to the exact location without receiving anything more from that caller than the fact there is an emergency. The prior art has not disclosed this capability.

In practicing the method of the present invention, an iterative process can be used which is customized to the requirements of the specific product being created. These requirements depend upon: the geographic area being mapped, the intended use of the product, client specifications, and other factors that may occur. This iterative process may include some, all or none of the steps detailed below. One skilled in the art will easily comprehend that a virtually limitless array of attributes can be attached to point features in the disclosed embodiment of the present invention by following the steps described below.

A text list of APN/PIN numbers with land-use codes for the region is correlated to the database by matching the APN/PIN numbers so that the land-use code of each area where there is no structure is included as a field value in the present invention's database. The land-use code thereby becomes an attribute of parcel polygons with no structure.

A text list of APN/PIN numbers or physical addresses with owners' names for the region is correlated to the database by matching the APN/PIN numbers so that the owner name of each structure is included as a field value in the present invention's database. The owner's name thereby becomes a unique attribute of each point feature.

A text list of APN/PIN numbers or physical addresses with owners' genders for the region is correlated to the database by matching the APN/PIN numbers so that the owner name of each structure is included as a field value in the present invention's database. The owner's gender thereby becomes a unique attribute of each point feature.

A text list of APN/PIN numbers or physical addresses with phone numbers for the region is correlated to the database by matching the APN/PIN numbers so that the owner name of each structure is included as a field value in the present invention's database. The phone number thereby becomes a unique attribute of each point feature.

A text list of APN/PIN numbers or physical addresses with building use codes for the region is correlated to the database by matching the APN/PIN numbers so that the building use code of each structure is included as a field value in the present invention's database. The owner name thereby becomes a unique attribute of each point feature.

A text list of APN/PIN numbers or physical addresses with SIC codes for the region is correlated to the database by matching the APN/PIN numbers so that the owner name of each structure is included as a field value in the present invention's database. The SIC code thereby becomes a unique attribute of each point feature.

A text list of APN/PIN numbers or physical addresses with assessed property values for the region is correlated to the database by matching the APN/PIN numbers so that the assessed value of each structure is included as a field value in the present invention's database. The owner name thereby becomes a unique attribute of each point feature.

A text list of APN/PIN numbers or physical addresses with number of employees is correlated to the database by matching the APN/PIN numbers so that the number of employees of each structure is included as a field value in the present invention's database. The owner name thereby becomes a unique attribute of each point feature.

A text list of APN/PIN numbers or physical addresses with total sales volume is correlated to the database by matching the APN/PIN numbers so that the total sales volume of each structure is included a&s a field value in the present invention's database. The owner name thereby becomes a unique attribute of each point feature.

A text list of APN/PIN numbers or physical addresses with household income is correlated to the database by matching the APN/PIN numbers so that the owner name of each structure is included as a field value in the present invention's database. The household income thereby becomes a unique attribute of each point feature.

As stated earlier, the reader will easily see that this process can be repeated for any attributes for which data exists or can be collected.

The assembled data, including maps, street centerlines, orthophotographs, point features, any features not here named, and associated attributes are then rendered for display and analysis in standardized, off-the-shelf and/or customized data formats. The present invention makes use of existing modes of data presentation, such as CAD and GIS software, and is adaptable to any present mode of display. It is expected that the present invention will be fully compatible with future developments in data display software.

The seven market sectors together with information on specific markets within each sector set forth below are representative applications for the method of the present invention:

I. Location-Based Services:
   A. Personal, Real-Time Navigation
   Real-time display of maps by in-car navigation unit, Personal Digital Assistant (PDA), handheld computer or any device that shows the location of the user on a map.
   B. Mobile Commerce/Destination Sales Mapping
   Determination of location of clients and potential clients using map and demographic information.
   C. Proximity Search and Location Services
   Real-time location and map display of services in the proximity of the user, and how to find them.
   D. Location-Based, Hand-Held Computing
   Real-time location and map display of services in the proximity of the user, and how to find them.
   E. Wireline and Wireless Internet Services II. Transportation/Logistics:
   A. Fleet Logistics
   Fleet management and route management in relation to location of clients and transportation network.

B. Driver Directions and Routes

Determination and display of the most efficient route and driving directions to a destination.

C. Concierge Services

Supplying handheld computers with maps to direct clients, i.e., visitors, conference participants, to the exact locations of such places as restaurants, shopping centers and transportation facilities.

D. Load Order End Capacity

Determination of most efficient routes for drivers and fleet of vehicles by combining maps, location of clients and load specifications.

E. Vehicle Dispatch and Tracking

Real-time location of vehicles via on-board GPS units, allowing dispatcher to direct vehicles to a desired location.

III. Telecommunications:

A. Network-Planning and Expansion Analysis

Mapping of existing network lines and the position of existing and potential clients, allowing informed planning of new, expanded or upgraded networks.

B. Market Demand and Facility Requirements

Mapping of existing network lines and the position of existing and potential clients, allowing a telecommunication company to analyze demand and plan appropriate facility specifications to meet market demand.

C. Competitive Analysis Customer Tracking

Mapping location of competitors' clients.

D. Internet Network Planning and Design

Mapping of existing network lines and the position of existing and potential clients, for planning and design of Internet services.

E. Call Tracking and Analysis

Locating clients who report errors in the network and locating the trouble locations in relation to facilities.

F. Media Planning

Locating clients and the type of media, e.g., television, radio and newspaper, that reaches those clients for media planning.

G. Targeted Marketing

Locating potential clients by analyzing addresses of existing clients, demographics and locations of related services.

IV. Utilities:

A. Facilities and Infrastructure Management

Mapping of existing utility infrastructure and position of existing and potential clients, facilitating network management.

B. Service Vehicle Routing and Tracking

Real-time location of vehicles via on-board GPS units, allowing dispatcher to direct vehicles to a desired location.

C. Outage and Emergency Management

Locating clients who report errors in the network and locating the trouble locations in relation to facilities.

D. Customer Information System and Customer Service

Location of customers and analysis of information such as use patterns, demographics, and the like to project future needs and to design systems that meet actual needs.

E. Marketing and Expansion Planning

Analysis of map and demographic information to determine location of clients and potential clients.

F. Legal, Taxation and Finance

Analysis of client location in relation to legal and taxation boundaries to determine appropriate user fees and legal obligations.

V. Insurance:

A. Risk Management

Pinpointing geographic address location of existing and potential clients to determine what type of hazards or risks apply.

B. Compliance Monitoring

Pinpointing geographic address location of existing and potential clients to ensure that the insurance company is not discriminating illegally in writing insurance policies.

C. Territory Creation and Management

D. Customer Service

E. Fraud Detection

F. Routing Claims Adjusters

Pinpointing policy-holder locations to direct claims adjusters to specific addresses for claims assessment.

VI. Government:

A. E911 Dispatch and Deployment

Dispatch of emergency resources to address locations requesting emergency services.

B. Public Safety Answering Points (PSAP) Applications

Dispatch of emergency resources to address locations requesting emergency services.

VII. Retail:

A. Customer Profiling

Analysis of customer address locations and demographics to learn more about business' customers and to provide better service.

B. Demographic Analysis

Use of information about customers, such as income level, type of dwelling, number of vehicles, age, etc. to inform business decisions, marketing and product development.

C. Customer Service

See VII A above.

D. Market Analysis

Use of demographic and location information to analyze markets and how well business is meeting potential.

E. Site Selection

Use of demographic and location information to analyze markets and where and how business might expand.

F. New Product Introduction

Use of demographic and location information to analyze customer interests, buying habits, lifestyles, and the like to inform product development, introduction and marketing.

G. Targeted Marketing

Locating potential clients by analyzing addresses of existing clients, demographics and locations of related services H. Media Placement and Media Planning Locating clients and the type of media, e.g., television, radio and newspaper, that reaches those clients for media planning.

The following describes a specific example of application of method of the present invention. This Example is intended to be illustrative and is not intended to limit the invention.

EXAMPLE

A specific product created using the method of the present invention was created for the City of Vallejo, Calif., Police Department, detailing the city of Vallejo, Calif. (the Vallejo Product). This example refers to a single public building, the Vallejo Community Center, located at 225 Amador St., Vallejo, Calif. 94590. One skilled in the art will recognize that exactly the same specific process steps were simultaneously performed for every other structure/address within the city of Vallejo for this product.

Figure 5:
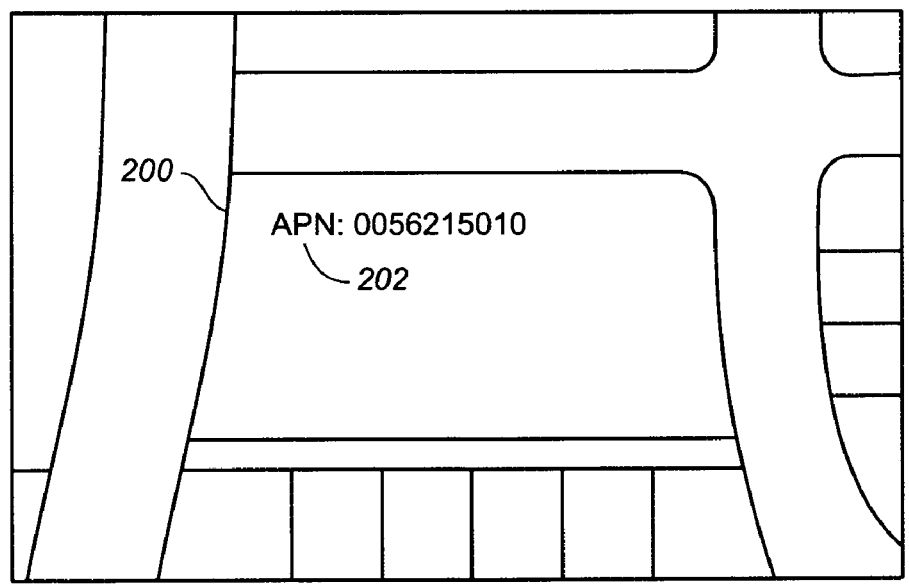
FIG. 5 shows a prior art surveyed parcel polygon and the unique APN for that polygon of used in a specific example of the present invention.

The Vallejo Product began with surveyed parcel polygon data. FIG. 5 shows the surveyed parcel polygon 200 for the Vallejo Community Center. This data was entered into a computer by digitally scanning paper records of parcel data. Additionally, FIG. 5 shows the unique Assessor Parcel Number 202 (APN) or Parcel Identifier Number (PIN) associated with the parcel on which the Vallejo Community Center is located.

Figure 6:
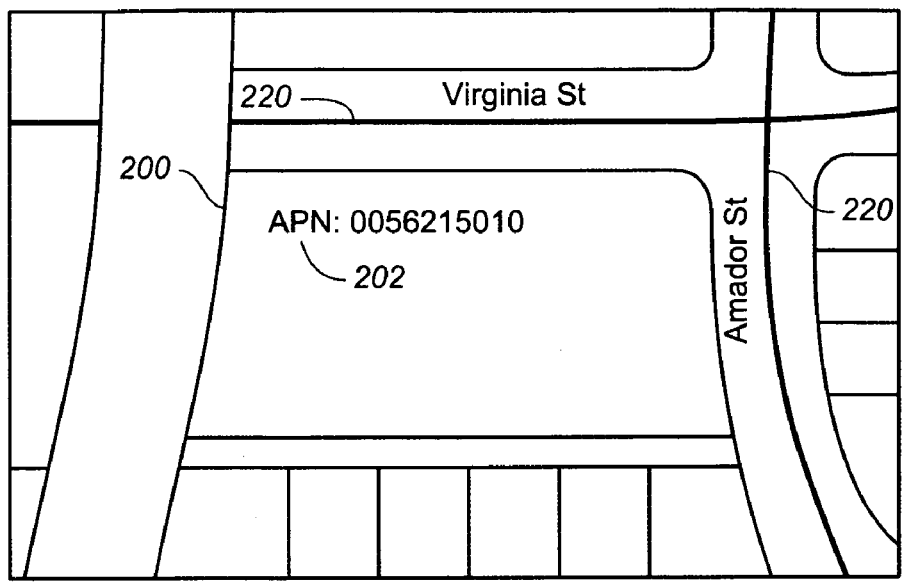
FIG. 6 shows the prior art surveyed parcel polygon shown in FIG. 5 without the APN overlay onto of this specific example.

The computer system used for the Vallejo Project was configured as follows:

i) Intel Pentium 4 Processor at 2.66 GHz
ii) 512 MB RDRAM
iii) 120 GB Ultra ATA/100 Hard Drive Next, this digitized parcel information shown in FIG. 6 was overlaid onto a digital map of the region. FIG. 6 shows the parcel polygon 200 for the Vallejo Community Center overlaid on the digital map 220.

By means of a standard geometric algorithm performed by computer, in this case the software program ArcView 3.2a, the geometric center point, or centroid, of the parcel polygon was calculated as described under the DETAILED DESCRIPTION OF THE BEST MODE OF THE INVENTION section. In the next step of the present process, the derived centroid point feature for the Vallejo Community Center was substituted on the map for the parcel polygon lines. The point feature retained the labeled APN's or PIN's of the original map.

Figure 7A:
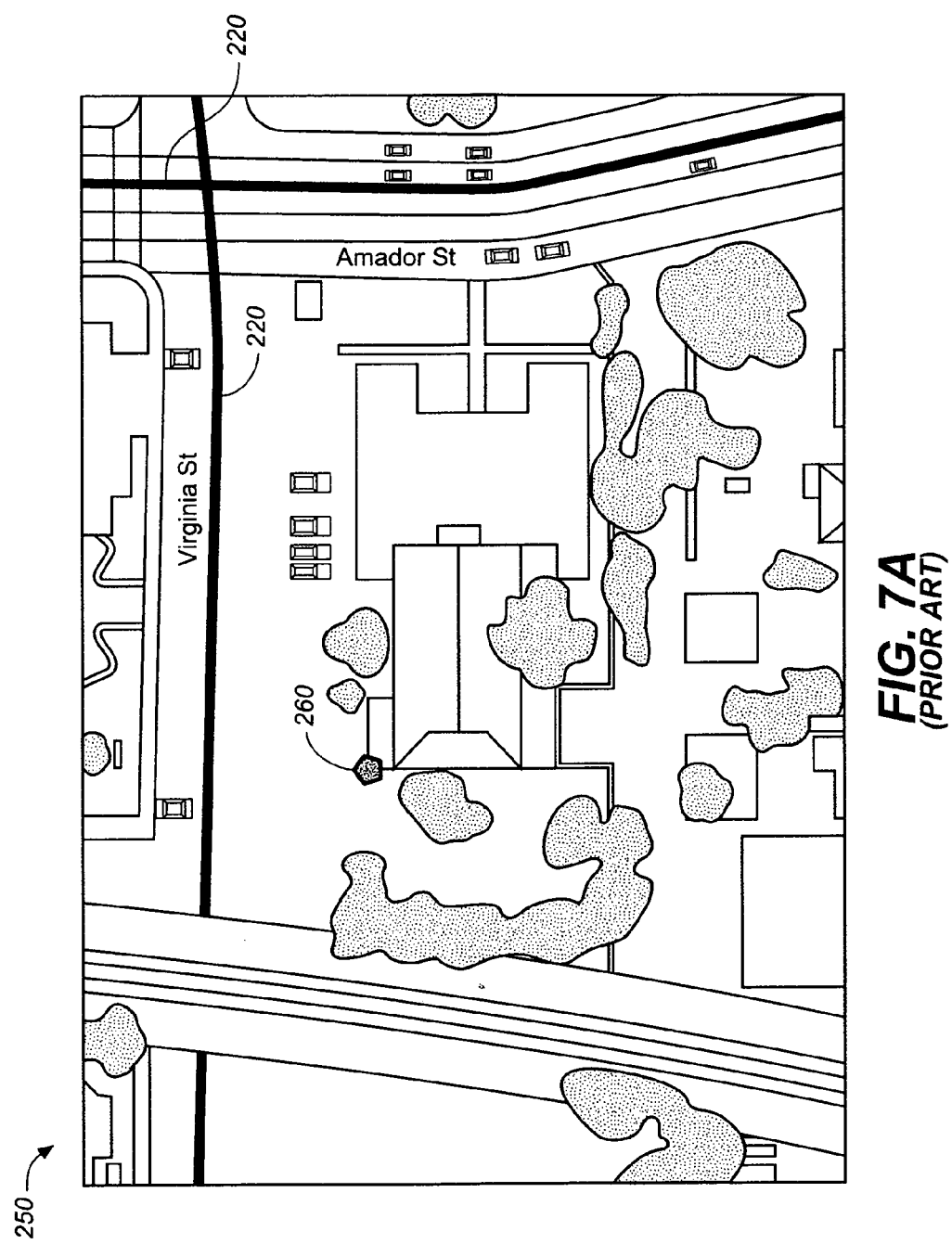
FIG. 7A shows the prior art orthophotograph/map overlay of the surveyed parcel polygon of used in this specific example before correction of the centroid on the point feature.
Figure 7B:
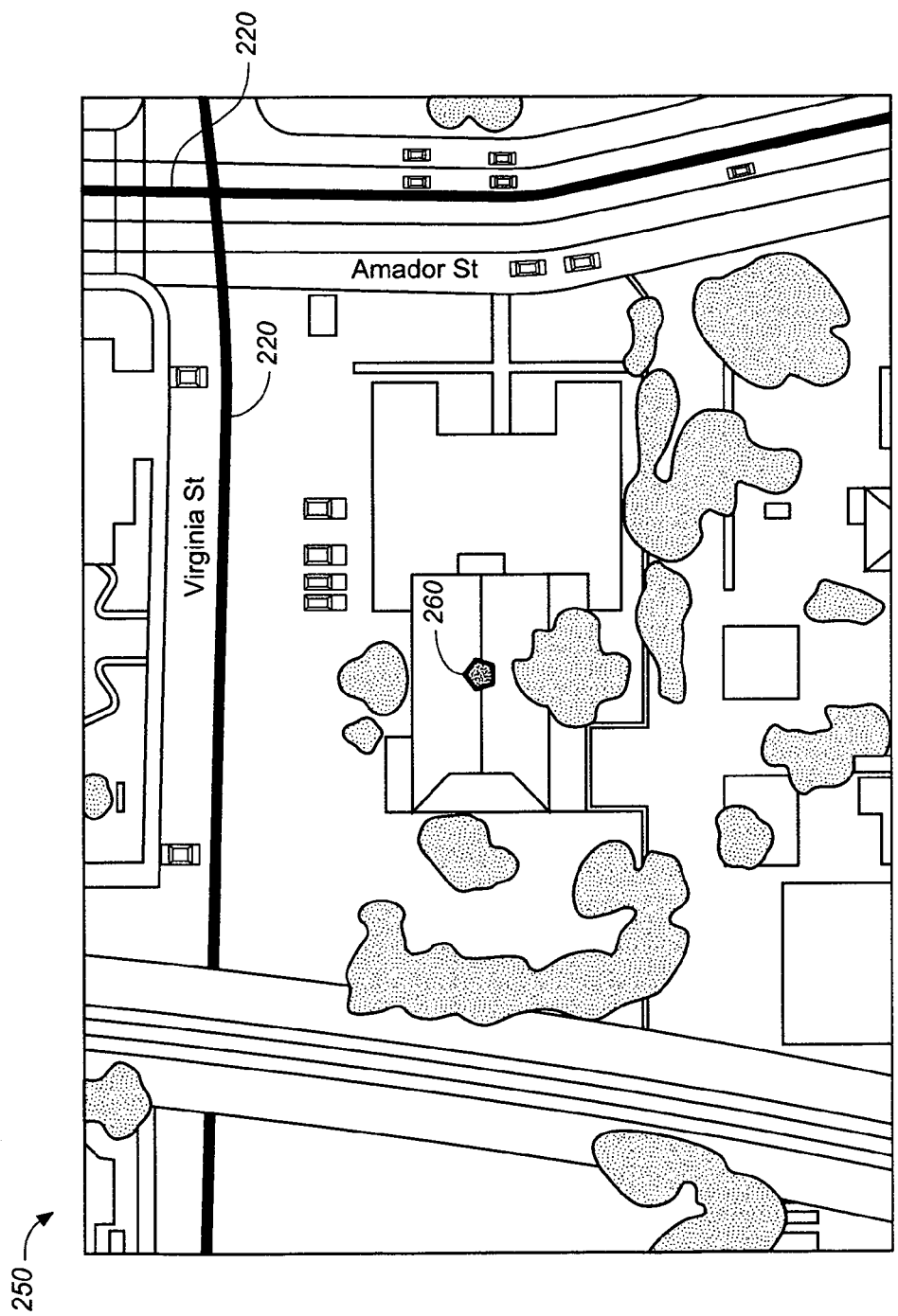
FIG. 7B shows the orthophotograph/map overlay of the surveyed parcel polygon of this specific example after correction of the centroid on the point feature.

The accuracy of the Vallejo Product was further verified by the following method: a georeferenced orthophotograph 250 was obtained for the region. In this instance, it was already digitized, but if it had not been, it would have been digitally scanned into the computer. Using the latitude and longitude markers of the photograph and the map data the map 220 was overlaid onto the photograph 250. An operator examined the combined photo 250 and map 220 to verify and correct map features, and to determine if there are any structures on each parcel polygon. The operator corrected the digital map with point features to reflect the presence and exact location of structures and other map features. FIGS. 7a and 7b show a composite of the digital map with point features overlaid onto the orthophotograph to illustrate the location of the point feature for the Vallejo Community Center before and after correction of the centroid point. It is desirable that the centroid point 260 is approximately within the center of the outer periphery of the main building of the Vallejo Community Center as seen in the orthophotograph.

In the next step of the method of the present invention, the point feature was referenced to the latitude and longitude indicated by the map, in this case by the software program ArcView 3.2a, from the map coordinates and the map location of the point feature. The latitude/longitude of the point feature associated with the Vallejo Community Center is 6491410.75/1798935.81.

Figure 8:
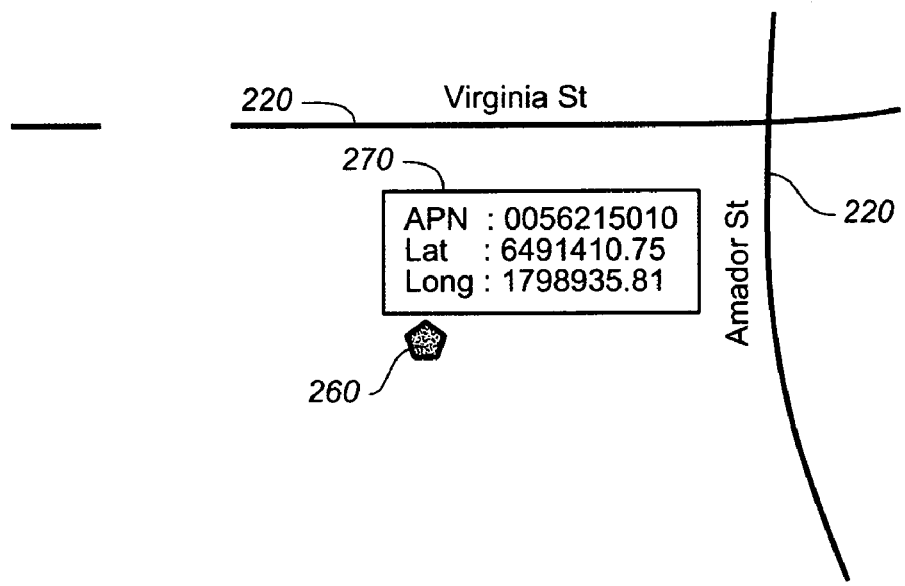
FIG. 8 shows the APN number and the specific latitude and longitude as attached attributes of the surveyed prior art surveyed parcel polygon used in this specific examples.

The two attributes associated at this stage of the process with the point feature, latitude/longitude coordinates and APN/PIN number, derived in the process of combining basic source data, are the first of many attributes that can be attached to point features in the present invention, and viewed, for example, on a computer monitor, in the Vallejo Product. FIG. 8 shows the point feature associated with the Vallejo Community Center on the digitized map, with a dialogue box 270 such as a viewer might use to see the latitude/longitude and APN/PIN number (shown) as well as other attributes (not shown.)

After the above steps have also been completed for every parcel polygon in the city of Vallejo, one skilled in the art will recognize that there existed at this stage in the process, digital imagery associated with the maps and orthophotographs, and text information in the form of the APN/PIN number and latitude/longitude coordinates. It is one innovation of the present invention to allow a user to view on a monitor or other output device these specific attributes of a particular structure or property by electronically selecting (by mouse, keyboard, pointer or any other means) a digital point feature representing that structure. Reference to FIG. 8 illustrates this function.

There were a number of attributes for structures or point features that were required in the Vallejo Product of the present invention. The attributes are set forth in Table 1 below:

TABLE 1

| ATTRIBUTES | |
|---|---|
| Parcel number | ZIP |
| Unique id | ZIP + 4 |
| Physical address of building | Consumer Phone Number |
| Street prefix | Age code |
| Street name | Birth Year |
| Street type | Birth Month |
| Street suffix | Income Code |
| Building number | Length of Residence code |
| Unit number | Home Value code |
| All address | Own or Rent |
| City | House or Apartment |
| State | Marital Status |
| ZIP | Business Owner Name |
| ZIP4 | Business Name |
| County | Business Address |
| Building use code | City |
| Building use code description | ZIP |
| Year building built | ZIP4 |
| Number of stories | Business Phone |
| Tax owner name | SIC Code |
| Actual city where building resides | Business Owner Last Name |
| Fire beat boundary | Business Owner First Name |
| Police beat boundary | Title |
| Reporting Districts key | Title code |
| Map Page key | Gender |
| Consumer Name | Business Size code |
| Salutation | Business Sales Volume code |
| First Name | Business Fax |
| Middle Initial | Office Size code |
| Last Name | Location Number |
| Gender | Subsidiary Number |
| Consumer Address | Secondary SIC Code |
| City | |

All of these attributes listed in Table 1 were recorded as textual information and organized in a database as a text list. That is, a computer record, which separates and associates individual pieces of information in a logical fashion so that an operator, or another computer program or programmed routine, can conduct simple or sophisticated searches and sorting of the data so organized by means well known to one skilled in the art.

So the point feature of the Vallejo Community Center in this Example now had a name (its APN/PIN number: Number) and a geographical location (lat/long). A text list of APN/PIN tags and physical addresses for the entire region of Vallejo was correlated to the database by matching the APN/PIN tags so that the physical address of each structure was included as a field value in the present invention's database. The physical address of the Vallejo Community Center, 225 Amador St. Vallejo, Calif. 94590, thereby became a unique attribute of the point feature of the Vallejo Community Center. Therefore, a user of the present invention in Vallejo can view the physical address of the Vallejo Community Center by electronically selecting (by mouse, keyboard, pointer or any other means) the digital point feature representing that structure. FIG. 8 also illustrates this function, since that physical address can also be shown in the dialogue box 270 once the user makes the selection.

At this stage the process for the Vallejo Product, an iterative process began which was customized to the requirements of the user. By the same process that correlated the street address to the Vallejo Community Center, all other addresses in Vallejo were similarly correlated to geographically accurate point features. By this same data-matching process, linking APN/PIN numbers, the attributes set forth in Table 1 above were correlated to the Vallejo Community Center and to every other point feature in Vallejo.

The assembled data, including maps, street centerlines, orthophotographs, point features, any features not here named, and associated attributes were then rendered for display and analysis in an ArcView 3.2a-shape file format. The foregoing Example constituted the Vallejo Product.

Figure 9A:
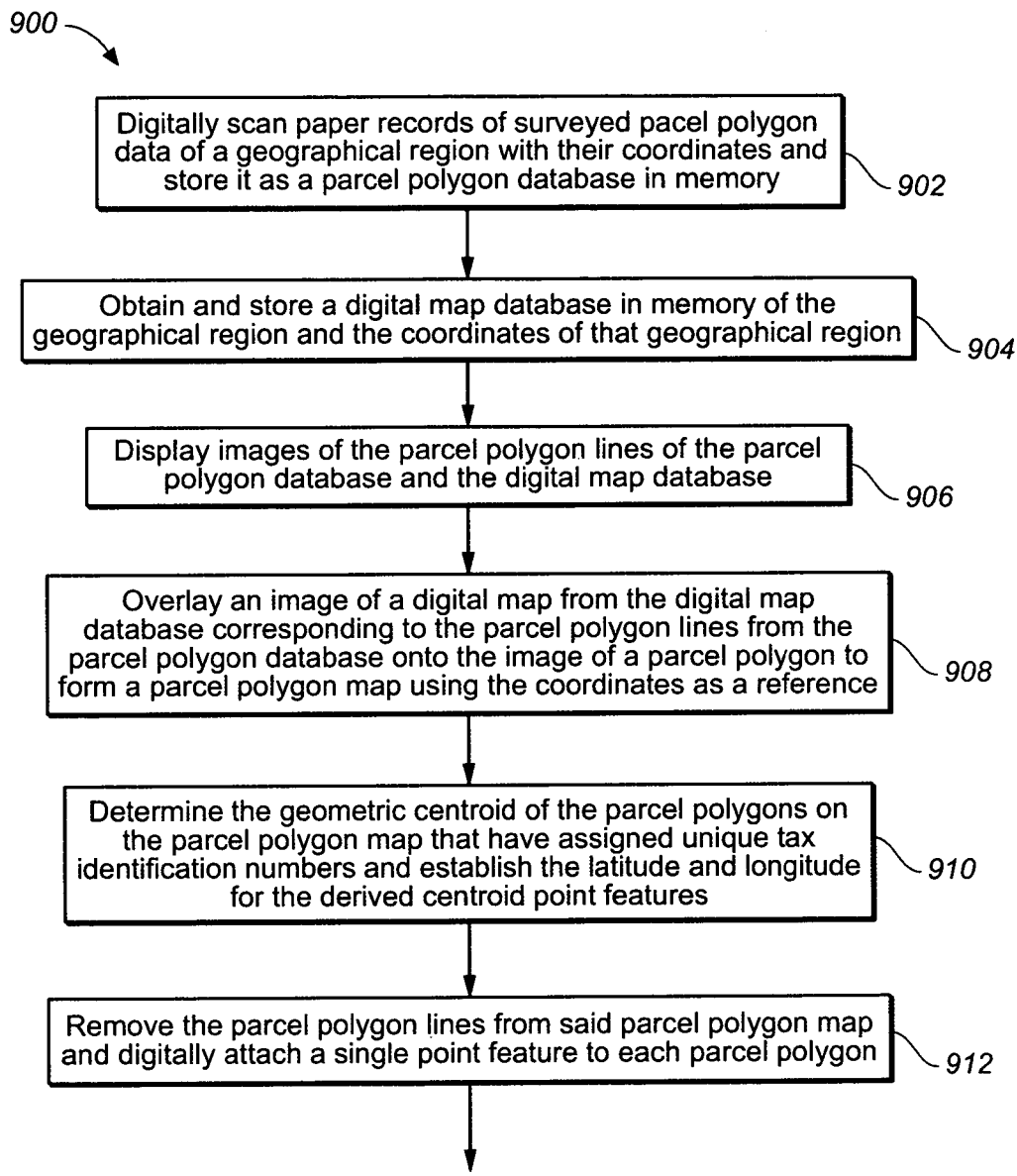
FIG. 9A is a first portion of a flowchart of one embodiment of the method of the present invention for geospatially mapping at least one parcel polygon within a geographical region and for displaying at least one specific attribute of each parcel polygon as an attached attribute of latitude and longitude coordinates.
Figure 9B:
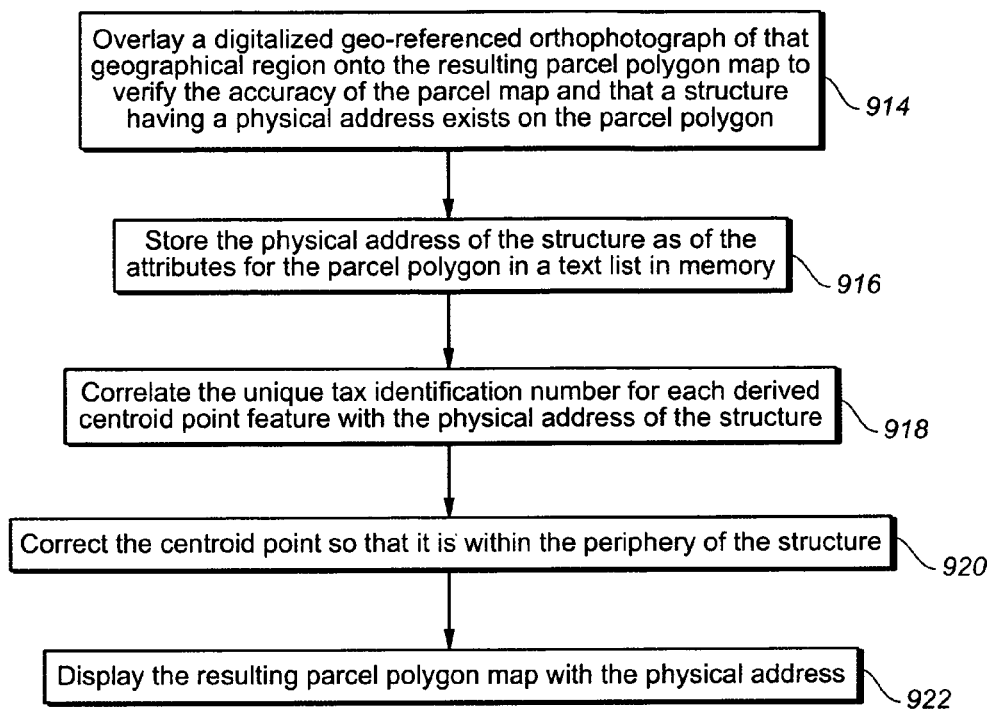
FIG. 9B is the remaining portion of flowchart shown in FIG. 9A.

FIGS. 9A and 9B illustrate flowchart of a method 900 of geospatially mapping at least one parcel polygon 60 within a geographical region and for displaying at least one specific attribute of attributes 40 of each parcel polygon 60 as an attached attribute of latitude and longitude coordinates that has the following steps:
  (1) step 902 of digitally scanning paper records of surveyed parcel polygon data of a geographical region with their coordinates and store it as a parcel polygon database in memory;
  (2) step 904 of obtaining and storing a digital map database in memory of the geographical region;
  (3) step 906 of displaying images of the parcel polygon lines of the parcel polygon database and the digital map database;
  (4) step 908 of overlaying an image of a digital map from the digital map database corresponding to the parcel polygon lines from the parcel polygon database onto the image of a parcel polygon to form a parcel polygon map using the coordinates as a reference;
  (5) step 910 of determining the geometric centroid of the parcel polygons on the parcel polygon map that have assigned unique tax identification numbers and establish the latitude and longitude for the derived centroid point features;
  (6) step 912 of removing the parcel polygon lines from said parcel polygon map and digitally attaching a single point feature to each parcel polygon;
  (7) step 914 of overlaying a digitized geo-referenced orthophotograph of that geographical region onto the resulting parcel polygon map to verify the accuracy of the parcel map and that a structure having a physical address exists on the parcel polygon;
  (8) step 916 of storing the physical address of the structure as one of the attributes for the parcel polygon in a text list in memory;
  (9) step 918 of correlating the unique tax identification number for each derived centroid point feature with the physical address of the structure;
  (10) step 920 of correcting the centroid point so that it is within the periphery of the structure; and
  (11) step 922 of displaying the resulting parcel polygon map with the physical address.

Figure 10:
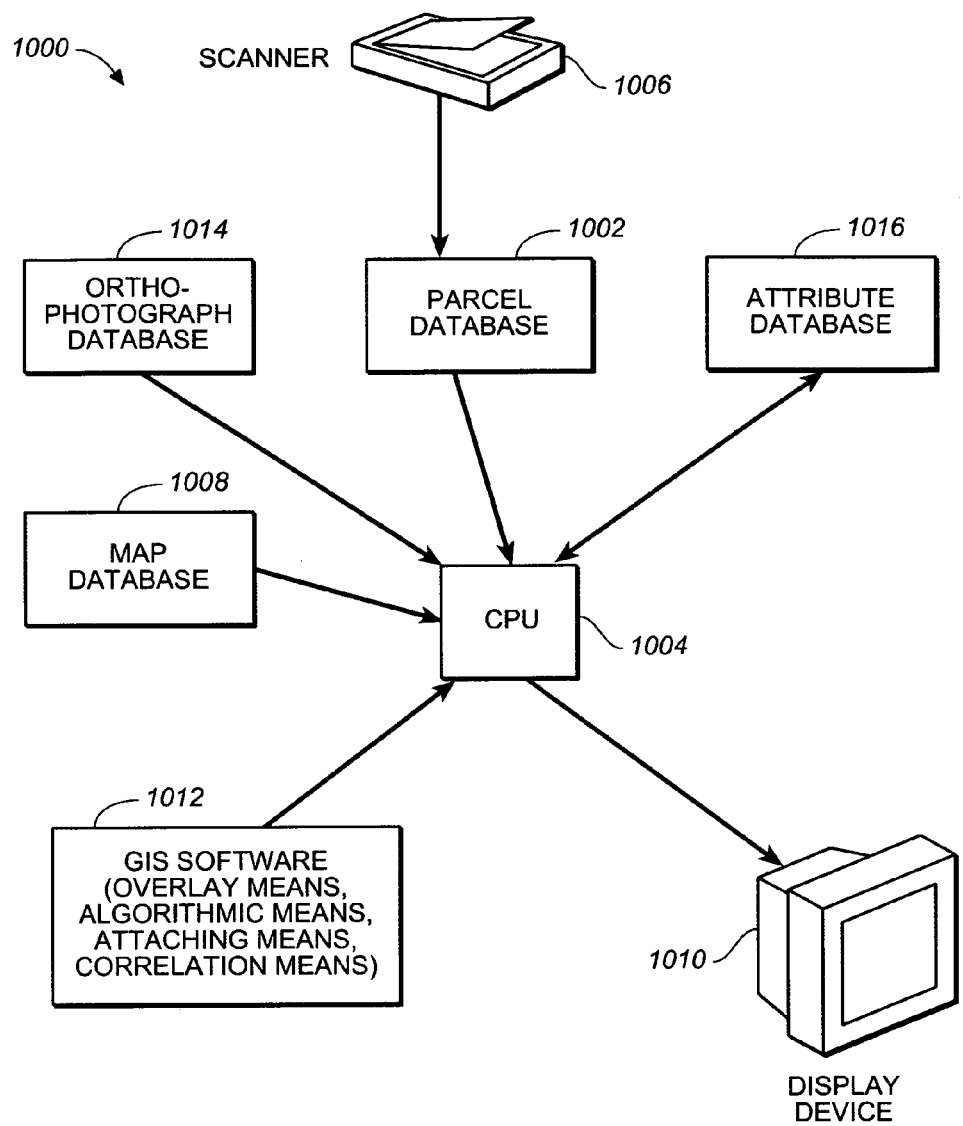
FIG. 10 is a block diagram of the components of one embodiment of the geographic information system of the present invention for geospatially mapping at least one parcel polygon within a geographical region and for displaying at least one specific attribute of each parcel polygon as an attached attribute of latitude and longitude coordinates.

FIG. 10 is a schematic diagram of the geographic information system for carrying out method 900. Parcel polygon database 1002 is stored in the memory of CPU (central processing unit) 1004. Polygon database 1002 includes the parcel polygon data of a specific geographical region having certain latitude and longitude coordinates that have been digitally scanned by scanner 1006. Map database 1008 is also stored in CPU 1004 memory and comprises the digital map of the geographical region and its coordinates. Display device 1010 can be any suitable display terminal well known in the art capable of displaying to the user images of the lines of the parcel polygons of polygon database 1002. CPU 1004 contains suitable GIS software 1012 that has overlay means, algorithmic means, attaching means and correlation means. Overlay means is capable of overlaying an image of the digital map that corresponds to the lines of the parcel polygon onto a parcel polygon map. Algorithmic means is capable of determining the geometric centroid of the parcel polygon on the parcel polygon map that has an assigned unique tax identification number and for establishing the latitude and longitude for the derived centroid point feature. Attaching means is capable of removing the parcel polygon lines from the parcel polygon map and for attaching a single latitude and longitude point feature to each parcel polygon. Orthophotograph database 1014 is stored in CPU 1004 and contains a digitized georeferenced orthophotograph of the geographical region. Overlay means is also capable of overlaying the digitized georeferenced orthophotograph of the geographical region containing latitude and longitude markers onto the resulting parcel polygon map of the attaching means to verify the accuracy the accuracy of the parcel polygon map and that a structure having a physical address exits on the parcel polygon. Attribute database 1016 is a storage means for a text list of at least the physical address of the structure as at least one of the attributes for each parcel polygon according to its assigned unique tax identification number. Correlation means is capable of correlating and attaching the unique tax identification number for each derived centroid point feature of the parcel polygon map to at least one attribute of that point feature from the text list stored in storage means, i.e., attribute database 1016, where the physical address of the structure is the at least one attribute. The centroid point feature is then corrected so that the centroid point is within the periphery of the structure before display device 1010 is used to display the resulting parcel polygon map from the correlation means with the attached attribute or attributes.

Without departing from the spirit and scope of this invention, one of ordinary skill in the art can make various changes and modifications to the invention to adapt it to various usages and conditions. All such changes and modifications are properly, equitably, and intended to be, within the full range of equivalents of the following claims.

What is claimed is:

1. A method for geospatially mapping at least one parcel polygon within a geographical region and for displaying at least one specific attribute of each parcel polygon as an attached attribute of latitude and longitude coordinates comprising the steps of:
  a) digitally scanning paper records of surveyed parcel polygon data of at least the geographical region and the latitude and longitude coordinates of that region and storing the data as a parcel polygon database into a computer memory;
  (b) obtaining and storing as a digital map database into a computer memory a digital map of at least the geographical region and the latitude and longitude coordinates of that geographical region;

(c) displaying images of the parcel polygon lines of the parcel polygon database of step (a) and the digital map database of step (b);

(d) overlaying an image of a digital map from the digital map database corresponding to the parcel polygon lines of at least one parcel polygon from the parcel polygon database onto the image of the at least one parcel polygon to form a parcel polygon map using as a reference the latitude and longitude coordinates for that geographical region;

(e) determining the geometric centroid of the at least one parcel polygon on said parcel polygon map that has an assigned unique tax identification number and establishing the latitude and longitude for the derived centroid point feature;

(f) removing the parcel polygon lines from said parcel polygon map and digitally attaching a single latitude and longitude point feature to the at least one parcel polygon;

(g) overlaying a digitized geo-referenced orthophotograph of that geographical region containing latitude and longitude markers onto the resulting parcel polygon map of step (f) to verify the accuracy the accuracy of said parcel polygon map and that a structure having a physical address exits on the at least one parcel polygon;

(h) storing at the physical address of the structure as at least one of the attributes for the at least one parcel polygon in a text list in a computer memory;

(i) correlating the unique tax identification number for each derived centroid point feature of the at least one parcel polygon with the physical address of the structure as the at least one attribute of that point feature from the text list of step (h);

(j) digitally correcting the derived centroid point feature having at least the physical address attribute so that the centroid point is within the periphery of the structure; and (k) displaying the resulting parcel polygon map with the physical address as the at least one attribute for the at least one parcel polygon.

2. A geographic information system for geospatially mapping at least one parcel polygon within a geographical region and for displaying at least one specific attribute of each parcel polygon as an attached attribute of latitude and longitude coordinates comprising:

a) a parcel polygon database stored in a computer memory comprising digitally scanned paper records of surveyed parcel polygon data of at least the geographical region and the latitude and longitude coordinates of that region;

(b) a map database stored in a computer memory comprising a digital map of at least the geographical region and the latitude and longitude coordinates of that region;

(c) at least one output device for displaying images of the lines of the parcel polygons of database (a) and the digital map of database (b);

(d) overlay means for overlaying an image of a digital map corresponding to the lines of at least one parcel polygon onto the image of said polygon to form a parcel polygon map using as a reference the latitude and longitude coordinates for the region;

(e) geometric algorithmic means for determining the geometric centroid of the at least one parcel polygon on said parcel polygon map that has an assigned unique tax identification number and for establishing the latitude and longitude for the derived centroid point feature;

(f) attaching means for removing the parcel polygon lines from said parcel polygon map and for attaching a single latitude and longitude point feature to each parcel polygon;

(g) said overlaying means also overlays a digitized geo-referenced orthophotograph of the geographical region containing latitude and longitude markers onto the resulting parcel polygon map of attaching means (f) to verify the accuracy of the parcel polygon map and that a structure having a physical address exits on the at least one parcel polygons;

(h) storage means for a text list of at least the physical address of the structure as at least one of the attributes for each parcel polygon according to its assigned unique tax identification number;

(i) correlation means for correlating and attaching the unique tax identification number for each derived centroid point feature of said parcel polygon map to at least one attribute of that point feature from said text list stored in storage means (h) where the physical address of the structure is the at least one attribute;

wherein the centroid point feature is corrected so that the centroid point is within the periphery of the structure before said at least one output device is capable of displaying the resulting parcel polygon map from correlation means (i) with the attached attribute.

3. The system of claim 2, further comprising an attribute database for the text list of attributes for each parcel polygon within the geographical region and a search engine for matching the resulting parcel polygon map based on any of a plurality of attributes from the text list.

* * * * *